July 24, 1923.  
C. R. MANBERT  
CENTER DRIVE FOR GASOLINE PROPELLED CARS  
Filed Oct. 24, 1921  
1,462,713  
2 Sheets-Sheet 1
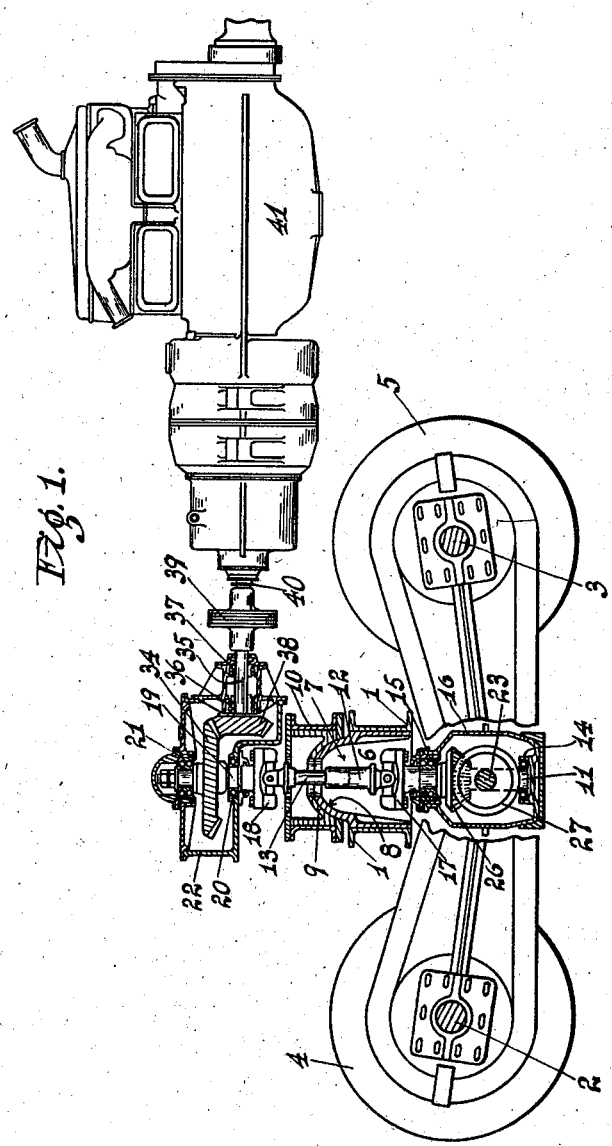
Inventor  
Calvin R. Manbert.  
By Harry C. Schwecke  
Attorney

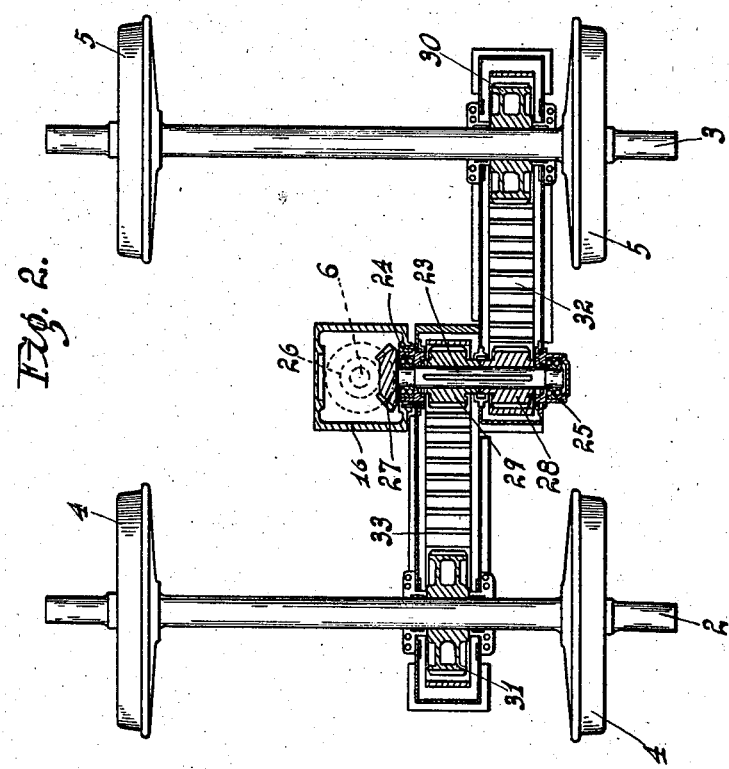

Patented July 24, 1923.

1,462,713

UNITED STATES PATENT OFFICE.

CALVIN R. MANBERT, OF OAKLAND, CALIFORNIA, ASSIGNOR TO CALIFORNIA CAR COMPANY, OF OAKLAND, CALIFORNIA, A CORPORATION OF CALIFORNIA.

CENTER DRIVE FOR GASOLINE-PROPELLED CARS.

Application filed October 24, 1921. Serial No. 509,955.

*To all whom it may concern:*

Be it known that I, CALVIN R. MANBERT, a citizen of the United States, residing at Oakland, in the county of Alameda and State of California, have invented certain new and useful Improvements in Center Drives for Gasoline-Propelled Cars, of which the following is a specification.

My invention is an improved driving mechanism for gasoline propelled cars, the gas engine being employed in the following manner.

The ordinary key bolt now securing the car truck to the body is removed and a ball and socket joint is placed in its stead. A vertical shaft, suitably driven by the gas engine, extends over said ball and socket joint and a horizontal shaft mounted on the truck, through which horizontal shaft suitable chains drive both truck axles.

The object of this construction is to enable both axles to be driven and also obviates the necessity of a complicated system of gears and universal joints between the engine and the driving axle. The particular construction of the ball joint is also valuable, in that the truck has absolute freedom of movement in all directions, as well as providing a simple means of placing the drive shaft therethrough to properly drive the truck axles.

Referring to the annexed drawings in which my invention is illustrated and which form a part of this specification:

Figure 1 is a vertical longitudinal section of my driving mechanism applied to a car truck and a gas engine.

Figure 2 is a horizontal section of my driving mechanism showing in plan the wheels and axle of a car truck.

In the drawings is shown a car truck including a truck frame 1, axles 2 and 3, wheels 4 and 5 respectively secured on said axles, and a vertical shaft 6. On said truck the car body is pivotally mounted by means of ball and socket joint 7 through which joint extends said vertical shaft; the ball member 8 of said joint being secured on the truck frame 1 and the socket member 9 of said joint being secured on the car body frame 10.

The vertical shaft 6 is a live shaft made in three sections 11, 12 and 13, the lower section 11 being journaled in bearings 14 and 15 in a housing 16 mounted on the truck, and being connected by universal joint 17 to the lower end of section 12 which section telescopes from the lower end of section 13. The upper end of vertical shaft section 13 is connected by a universal joint 18 to the lower end of a vertical shaft 19 journaled in bearings 20 and 21 in a housing 22 mounted on the car body. A horizontal shaft 23 is journaled at one end in a bearing 24 in housing 16 and at its other end in a bearing 25 on the truck. A bevel gear 26 is secured on the lower vertical shaft section 11 within the housing 16, which gear meshes with a bevel gear 27 secured on the inner end of shaft 23 also within said housing. Sprockets 28 and 29 are secured on the shaft 23 and sprockets 30 and 31 are respectively secured on the truck axles 2 and 3. A chain 32 extends over the sprockets 28 and 30 and a chain 33 extends over the sprockets 29 and 31. A bevel gear 34 is secured on the shaft 19 within the housing 22. A shaft 35 is journaled in bearings 36 and 37 on the housing 22 and a bevel gear 38 is secured on the inner end of said shaft within said housing in mesh with the bevel gear 34. The outer end of shaft 35 is coupled by a coupling 39 to the shaft 40 of a gas engine 41 mounted on the car body.

Having described my invention, I claim:

1. A driving mechanism for car trucks including a vertical shaft, a shaft journaled on the truck, a ball and socket joint joining the truck and the car body, the vertical shaft extending through said ball and socket joint, intermeshing gears on said vertical shaft and said shaft, sprockets on said shaft, sprockets on the axles of the truck, a chain extending over each sprocket on said shaft and a sprocket on one of said axles, and means for driving said vertical shaft.

2. In combination with a traction car, a live vertical shaft, means for driving said vertical shaft, a ball and socket joint joining the truck and the car body, said shaft extending through said ball and socket joint, and means to enable said vertical shaft to drive the axles and wheels of the car truck.

3. In combination with a traction car, a telescoping sectional vertical shaft, means for driving said shaft, a ball and socket joint joining the truck and the car body, said shaft extending through the center of movement between the car body and truck, and means to enable said shaft to drive said truck.

In testimony whereof I affix my signature.

CALVIN R. MANBERT.